2 Sheets--Sheet 1.

JOHN B. SLAWSON.
Improvement in Fare-Boxes.

No. 127,808.                                            Patented June 11, 1872.

Witnesses:
T. C. Brecht.
A. McCallum

Inventor
J. B. Slawson
by his Atty
P. Hannay

2 Sheets--Sheet 2.
JOHN B. SLAWSON.
Improvement in Fare-Boxes.
No. 127,808.  Patented June 11, 1872.
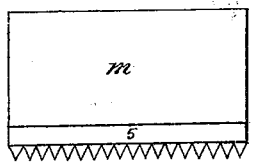
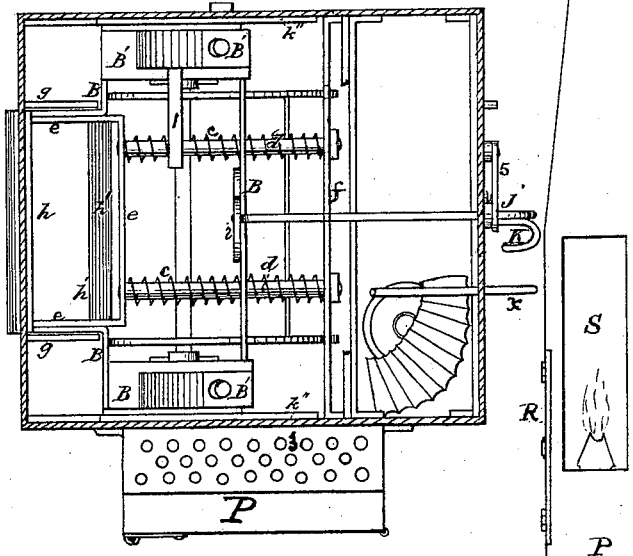
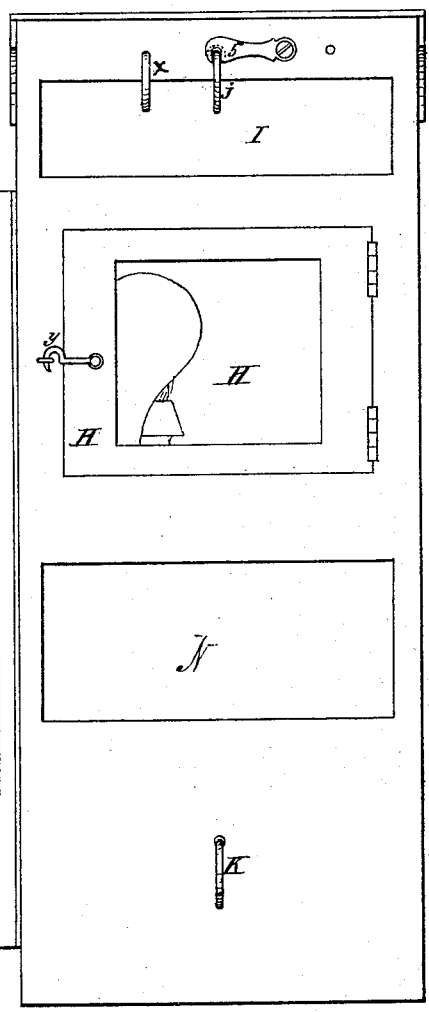
Witnesses:
J. C. Brecht.
A. McCallum
Inventor:
J. B. Slawson
by his Atty
P. Hannay 127,808

UNITED STATES PATENT OFFICE.

JOHN B. SLAWSON, OF NEW YORK, N. Y.

IMPROVEMENT IN FARE-BOXES.

Specification forming part of Letters Patent No. 127,808, dated June 11, 1872.

SPECIFICATION.

*To all whom it may concern:*

Be it known that I, JOHN B. SLAWSON, of New York, in the county of New York and State of New York, have invented certain Improvements in Fare-Boxes, of which the following is a specification, reference being had to the accompanying drawing, in which—

Figure 1:
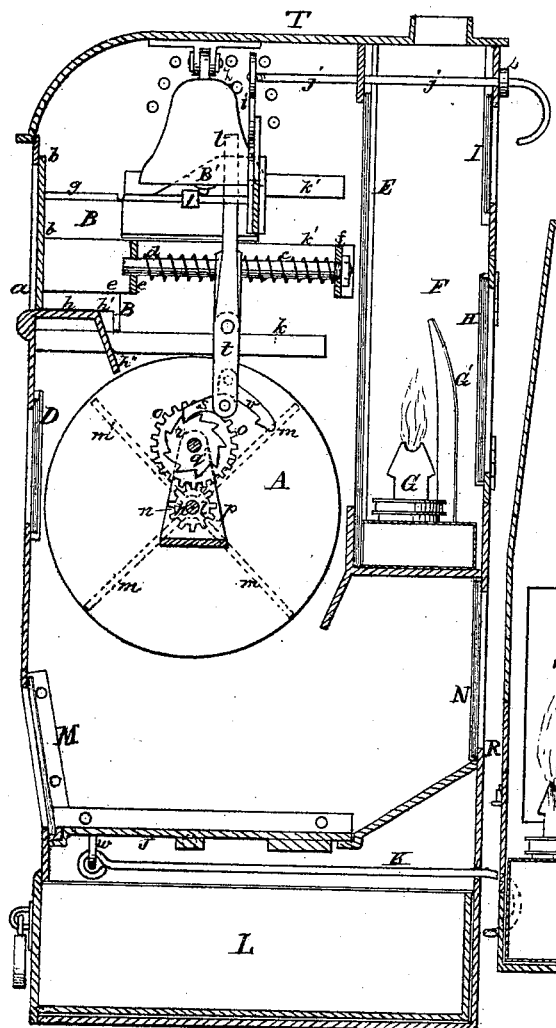
Figure 2:
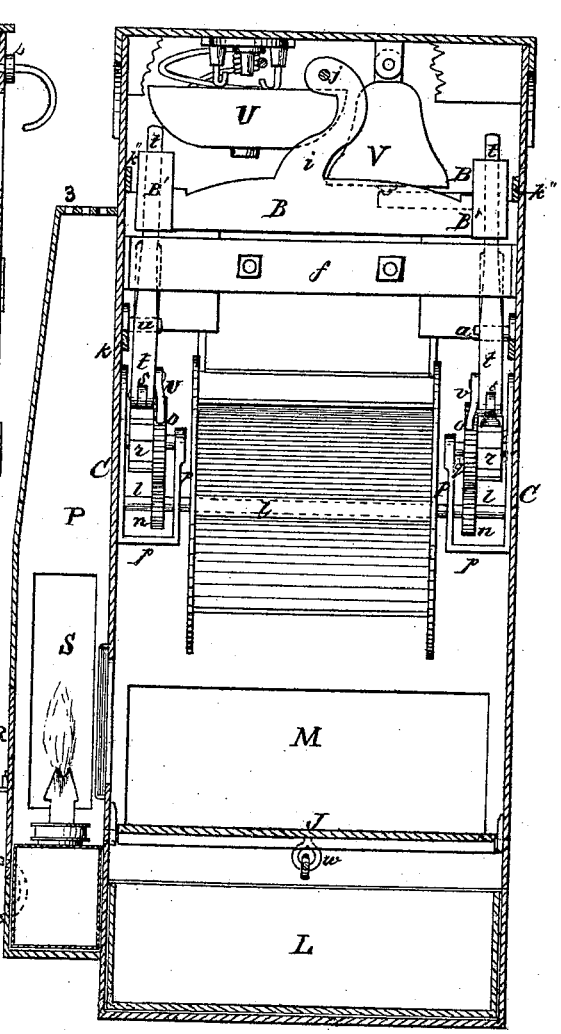

Figure 1 represents a vertical section from front to rear of my improved fare-box, taken near the side of the box on which the side lamp is situated, showing the end of the receiving-wheel and its operating mechanism in elevation; and Fig. 2, a similar view, but taken from side to side immediately in rear of the receiving-wheel, to show the arrangement of the operating mechanism. Fig. 3 represents a plan of the box, with the top or cover and inner lamp removed; and Fig. 4, a rear elevation of the box. Fig. 5 represents a plan of one of the partitions or blades of the arrest-wheel detached to show the serrations of its edge.

My invention relates to that class of fare-boxes in which the passengers in paying their fare are made to operate the devices used for protecting it against felonious abstraction from the lower part of the box, but is confined solely to that branch of that class in which a wheel provided with a series of radial fan-blades or partitions is rotated in a vertical plane, and used as a means of arresting the fare for inspection by the driver and passengers. A box thus constructed and operated is necessarily defective against fraud on the part of the passengers, as any one, two, or more can, by operating the box two or three times rapidly, defraud the proprietors—as, for instance, by first dropping in a spurious ticket or fare, or an insufficient amount, and then instantly operating the box again, which will cause it to pass directly into the drawer below among the fares previously deposited, and thereby defy identification or detection. To remedy this defect in this particular kind of box is the object of my invention; and it consists in combining with a receiving-wheel arranged and operated as above described a second arrest device below, entirely under the control of the driver or conductor, when used in connection with an opening, covered by a transparent medium, through which he may inspect the fare when so arrested; in connection with which another opening, protected by a similar transparent medium, may be used, through which the passengers can also inspect the fare when so arrested.

To enable others skilled in the art to make, construct, and use my improvement, I will now proceed to describe it in detail, reference being had to the drawing and to the letters of reference marked thereon.

The casing or sides of the box may be made of any suitable material so long as it possesses sufficient strength, durability, and rigidity to support the operative parts of the box, and the tear and wear incident to such an apparatus.

In the front of the box—*i. e.*, the side next the passengers—is formed an opening or gateway, $a$, through which the passengers deposit their fare. This opening is closed by means of a door, $b$, which may either be hinged or made to slide, as represented in the drawing, between the jambs or sides $g$ of the door-way $a$, and which, in this connection, form lateral guides for the door, while they also serve to close all ingress to the interior of the box, for which purpose the sill $h$ is also extended inward, and afterward deflected downward, as shown in Fig. 1, so as to form a slide or chute, $h''$, for the fare down which to slide, until arrested by or between the blades $m$ of the wheel A. The inward extension of the sill $h$ in a horizontal direction is not so great as the width of the jambs or sides of the door, which are intended to extend as far inward as, or slightly further than, the backward movement of the door $b$. This backward movement of the door is extended far enough to leave a space between the lower edge of the front of the door and the rear or inner edge $h'$ of the sill, of a width sufficient easily to pass the fare down the slide or chute $h''$ between the blades $m$ of the arrest-wheel A. The door $b$ for this purpose is secured to a frame, B, which is supported on and slides back and forth between guide-ways $k$ $k'$ $k''$, arranged one above the other, and secured to the inner side of the two sides C of the box. To the same sides, but in the rear of the frame B, is secured a cross-piece, $f$, which forms a support for two guide-rods, $d$, and to which they are rigidly secured in any well-known manner—as, for instance, by nut and screw, as represented in the drawing. These rods pass freely through openings made for that purpose in a cross-piece, e, secured to the sliding frame B. On each rod d is arranged a spiral spring, c, so as to bear against the rear side of the cross-piece e of the sliding door-frame and front side of the stationary cross-beam f. By this arrangement, when the door is pushed back by the hand to open the mouth of the box to pay a fare, the spring c is compressed between them, so that when released from the pressure of the hand the door, by the reaction of the springs, is again forced back to its original position, thereby closing the mouth of the box, as seen in Figs. 1 and 3. Instead of using two guide-rods d and springs c, only one of each may be employed satisfactorily; but the former mode is deemed preferable. On the stationary cross-bar f is erected a standard, i, or otherwise secured to it. To the upper end of this standard is secured the inner end of a pull-rod, j, the outer end of which is made to project through the rear of the box within convenient reach of the driver or conductor, for a purpose hereafter to be explained. Immediately below the main frame B and guide-rods d of the door b is arranged an arrest-wheel, A, consisting of two disks, A', mounted on a shaft, l, and connected together by a series of radial blades or partitions, m, framed or let into grooves formed in the face of the disks A, or otherwise secured thereto in any known or suitable manner. These blades in this case are made of stout glass, but may be made of any other suitable material. The edges of the blades m may be made serrated, like a saw, to increase the difficulty of extracting the fare; and when made of glass a serrated strip, 5, of metal or other suitable material, may be secured to them, instead of notching the glass itself, as seen in Fig. 5. Upon each end of the same shaft l, between the disks A' and sides C, are keyed pinions n, which mesh into gear-wheels o, whose shafts q turn in bearings formed in brackets p, secured to the sides c of the box. Upon each shaft q is mounted a ratchet-wheel, r, with the teeth of which a pawl, s, carried by a lever, t, engages. Each of the levers t has its fulcrum on a pivotal pin, u, secured to the sides C of the box. To the side of each lever is riveted or otherwise secured a stop-catch, v, which is so constructed and arranged as to engage with a tooth of the gear-wheels o each time the door is forced far enough back to unclose the mouth of the box, the object of which is to prevent the wheel A from turning further than is necessary to deposit a fare and prepare it for the reception of another, as will be more fully referred to hereafter.

Instead of using a lever, pawl, and gears on each side, it will be apparent that one set may be dispensed with; but it is deemed better to use the two, as thereby the operations will be performed more regularly than with a single set. The upper end of the levers are passed through an opening or slot cut in the end pieces B' of the sliding frame B of the door b. Thus arranged and combined, as the door b is pressed back its frame B will at the same time force back the upper end of the levers t, and their lower end forward, causing them, through the pawls s, to turn the ratchet-wheels r, and with the latter the gears o, which, in turn, impart motion to the wheel A through the pinions n, with which they mesh. In this case, there being four blades or partitions, m, to the wheel A, the ratchet, gear-wheels, and pinions are so constructed and arranged as to impart to the wheel a motion equal to one-fourth part of a revolution; and so, had there been but three blades, they would have been so made as to have imparted to it a one-third part of a revolution. Again, when the door b reaches the end of its backward motion, and, consequently, the upper end of the levers t also, this motion of the latter will have caused the tooth of the stop-catch v to engage with a tooth of the pinion o, arresting it, and through it the further revolution of the wheel A. The arrest of the gear o at this time will have brought the next blade m into proper position for arresting the next fare, while the forward movement of the door b by the reaction of the springs c will have carried with it the upper end of the levers t, thereby releasing the gears o from the stop-catch v, and leaving the wheel A again free to be turned upon the next backward movement of the door b. In the front of the box, opposite the revolving wheel, is arranged a glass light, D, while another, E, is arranged in the rear, both being framed into the box in such manner that they cannot be removed without taking the box apart.

These two windows serve the double purpose of lighting up the interior of the box, and of allowing the driver and passengers to see if any fare remains between or on the blades of the wheel, and undeposited in the box below. They may be also used as a means of examining the fare, although that is intended to be done upon the arrest-apron F below, to be hereafter described. Immediately in rear of the glass plate E is arranged a chamber, F, within which and at one corner is placed a lamp, G, and reflector G', for lighting up the wheel A, the glass partitions m allowing free passage to the fare of the rays of light. To this chamber access is had by means of a door, H, into which is framed a pane of glass, which enables the driver to make his change at night, and to look through the glass partition E into the wheel A; which latter he may also do through a glass-covered opening, I, arranged immediately above. The door is kept closed by means of a hook, y, and staple. Immediately below the wheel A an arrest-apron, J, is arranged and pivoted to the sides of the box; to the under side of which is secured an eye-staple, w, in which is linked one end of a pull-rod, K, the other end of which projects through the rear of the box, as seen in Fig. 1, within convenient reach of the driver or conductor. Below the apron J is arranged a drawer, L, into which the fare, when examined on the former, is dropped by the driver. This drawer, as in other fare-boxes, when in use, is kept securely locked, the keys remaining in possession of the proprietor or his authorized agent. Immediately opposite the apron J, in the front of the box, is arranged an opening, covered or protected by a transparent medium, M, for the convenience of the passengers, through which to examine their fare when dropped upon the arrest-apron J, there being for a similar purpose another opening arranged in the rear, and protected in the same way by a transparent medium, N, for the convenience of the driver or conductor. In this case the transparent mediums are represented as being made of glass, securely framed into the front sides of the box; but if desired they may be made of woven wire. On the outside of the box is arranged and secured a lamp-chamber, P, into which is placed a lamp, Q. The bottom and top of the chamber are provided with openings 3—the former for the ingress of air to feed the lamp-flame, and the latter for the escape of the gaseous products of the lamp. In the side of the box next this chamber, a little above or opposite to the arrest-apron J, is arranged a glass-covered opening, R, through which the light is cast upon the apron to light it up at night for the inspection of the fare as it is deposited upon it. Two other windows are made in the lamp-chamber—one in front and the other in rear—the latter, S, to assist the driver in making change, and the former to light up the inside of the car. On the side of this chamber is arranged a door, R, by which access is had to the lamp for trimming, filling, cleaning, &c. To the under side of the cover T of the box is secured a bell, U, to the tongue of which is attached a pull-rod, $x$, and which is made to project through the rear of the box within reach of the driver, and by which he calls the attention of the passengers to the payment of their fare. At the side of this bell is arranged another bell, V, which is suspended from the cover T by means of a pivotal pin $z$. The tongue of this bell is operated upon by a projecting arm, 1, secured to the sliding frame B of the door $b$ in such manner that each time the door is forced back the arm 1 will cause the tongue of the bell V to sound an alarm, and thus notify the driver or conductor that the door $b$ has been operated upon and a fare deposited. This bell may be dispensed with and a lever substituted therefor by suitably connecting it with the hammer or tongue of the bell U and main frame B.

The operation of the box as thus constructed is as follows: The first passenger desiring to pay his fare presses back the door $b$ as far as it will go, which will have left an open space between the door and the rear edge $h'$ of the horizontal part of the sill $h$; he then deposits his fare, which will descend over the slide $h''$, and by it be guided down upon or between the blades or partitions $m$ of the wheel A; this done he removes his hand, when the door will be again forced forward to its original position by the reaction of the springs $c$, which had meanwhile been compressed by the back movement of the door. Here the fare thus deposited remains until the next passenger pays his fare, which he does by simply going through the same operation, but which will have deposited the first fare upon the arrest-apron below; as in pushing back the door the latter will, by its backward movement, have caused the levers $t$, through the pawls $s$, ratchet-wheels $r$, gear-wheel $o$, and pinions $n$, to impart a one-fourth part of a revolution to the wheel A, thereby allowing the fare to drop upon the apron J. Again, as the door $b$ has been pushed back the arm 1, attached to its sliding frame, will have acted on the lower end of the tongue of the bell V, dragging it back until it slides over its upper edge, thereby imparting a vibratory motion to it, which causes it to sound an alarm on the bell so as to notify the driver that a fare has been paid. The fare, once on the apron J, is then inspected by the driver or conductor at his leisure through the opening N, it at that stage being entirely under his control, when, if satisfied that it is correct, he causes it to drop into the drawer L by pulling the rod K; otherwise he calls the attention of the passengers to the fact, and causes the mistake or fraud to be rectified, and which could not be done where the passing of the fare from the wheel A into the drawer L laid under the control of the passengers, as would be the case were the box unprovided with the arrest-apron J and openings M and N.

Another means of effecting this object may be used, which consists in fastening a button, 4, on the rod $j$ immediately on the outside of the rear of the box, and using in connection therewith a pivoted hook, 5, the hooked end of which (when the driver desires to stop the revolution of the wheel A in order to examine the fare arrested therein) is made to embrace the rod $j$ on the outside of the button 4, as shown in Fig. 4. This arrangement locks the door $b$, preventing it from being pushed back, and consequently the further turning of the wheel A. But this arrangement is not deemed so advantageous as that of the arrest-apron below, and will, as a rule, be used more as an adjunct to the latter than alone, although, of course, it may be used advantageously in a box provided with the supplementary arrest-apron J and openings M and N. In case the passengers fail to pay their fare promptly on entering the car, the driver calls their attention to the fact by pulling the rod $x$, which causes an alarm to be sounded on the bell V; the rod $x$, for this purpose, being attached at its inner end to the spring-tongue or hammer of the bell. When the last passenger has paid his fare the driver pulls the rod $j$, which will draw back the door $b$ and operate the wheel A, thereby depositing it for inspection upon the apron J below.

Having thus described my invention, what I claim as new, and desire to secure by Letters Patent, is—

1. The combination, in a fare-box, of the following instrumentalities, to wit: A mouth or opening, $a$, through which the passengers can deposit their fare in the box; a self-closing door, $b$, to cover the mouth; a wheel, A, provided with two or more blades or aprons, $m$, and arranged to rotate in a vertical plane, for the purposes of closing the passage to the lower part of the box, of receiving and arresting the fare when first deposited in the box, and afterward of transferring it below; mechanism, substantially as described, for connecting the self-closing door with the wheel A, in such manner that the opening of the door by one passenger to deposit his fare shall cause the fare of the next preceding passenger, through a partial revolution of the wheel, to be precipitated down into the examining-chamber below; a movable apron, J, solely under the control of the driver or conductor, for the purpose of temporarily arresting the fare so precipitated for examination; and an opening, N, covered by a transparent medium, so that the driver or conductor may through it inspect the fare when arrested, the whole being arranged substantially as set forth.

2. In combination with the devices set forth in the first claim, I claim an opening, M, covered by a transparent medium, for the purpose set forth.

3. In combination with a door which covers the mouth of a fare-box, and the opening of which operates a receiving-wheel, A, in the manner described, I claim a rod, $j$, button 4, and hook 5, or their equivalents, for the purpose set forth.

4. I claim a receiving-wheel, A, the blades $m$ of which are serrated on their outer edge, when used in connection with a fare-box, for the purpose set forth.

J. B. SLAWSON.

Witnesses:
   P. HANNAY,
   A. McCALLUM.